No. 681,017. Patented Aug. 20, 1901.
S. COHEN.
SAFETY ATTACHMENT FOR WATCHES.
(Application filed May 29, 1901.)

(No Model.)

Witnesses:
P. S. Johnson
W. F. Pfaff.

Inventor:
Simon Cohen
By W. T. Miller
Attorney

UNITED STATES PATENT OFFICE.

SIMON COHEN, OF ERIE, PENNSYLVANIA.

SAFETY ATTACHMENT FOR WATCHES.

SPECIFICATION forming part of Letters Patent No. 681,017, dated August 20, 1901.

Application filed May 29, 1901. Serial No. 62,313. (No model.)

*To all whom it may concern:*

Be it known that I, SIMON COHEN, a citizen of the United States, residing at Erie, in the county of Erie and State of Pennsylvania, have invented certain new and useful Improvements in Safety Attachments for Watches; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in safety attachments for watches, and more particularly to that class which involve the application of the safety attachment to the watch-chain swivel.

The object of my invention is to provide the swivel with a safety-hook which when advisable can be swung out into operative position and when not in use can be sheathed upon the swivel.

My invention consists of certain details of construction, which will be fully hereinafter described and claimed.

Figure 1:
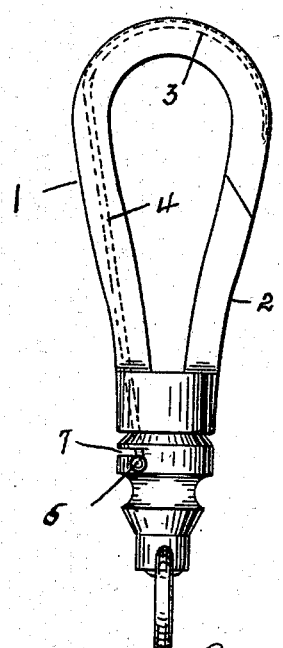
Figure 2:
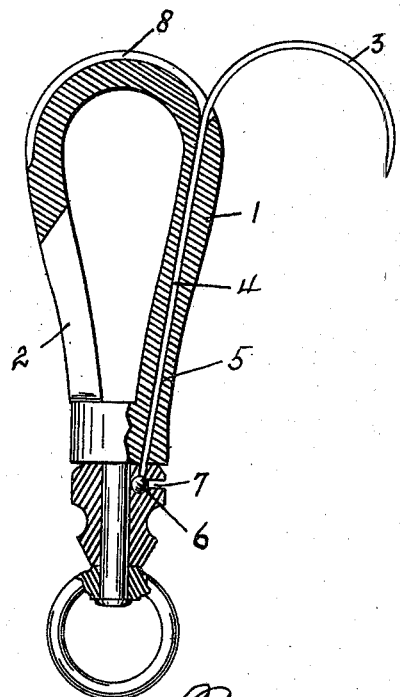
Figure 3:
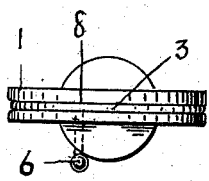
Figure 4:
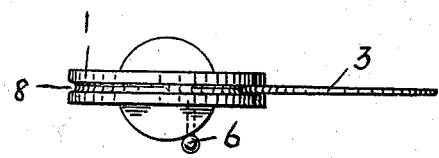

In the drawings, Figure 1 is a side elevation of the swivel, showing the hook in dotted lines and in sheathed position. Fig. 2 is an elevation of the opposite side of Fig. 1 with portions in section to show arrangements of parts. Fig. 3 is a top plan view of Fig. 1, and Fig. 4 is a similar view of Fig. 2.

Referring to the drawings, 1 is the longer curved arm of the swivel, and 2 is the shorter spring-arm. The hook 3 has its elongated shank 4 resting loosely but snugly in the socket 5, passing through the longer arm 1 of the swivel. The inner end of the shank 4 of the hook is turned outwardly at right angles to form the operating-handle 6, as shown in Figs. 3 and 4. This handle 6 is movable within the slot 7 to turn the hook to its two extreme positions. Centrally arranged across the outer face of the curved end of the arm 1 of the swivel is the curved groove 8, adapted for the reception of the hook 3 when in its inoperative position. A short slot at right angles to the slot 7 is provided just behind the handle 6 in Fig. 1, which permits the hook to be forced within the curved groove 8 after it has been turned into its inoperative position, as shown in Figs. 1 and 3.

When it is desirable for safety to employ the hook, the handle 6 is pushed out of the small slot and into the larger slot 7. This releases the hook 3 from its groove 8, and on turning the handle 6 in the slot 7 the hook is adjusted by hand into its operative position, as shown in Figs. 2 and 4. When the swivel, with the attached watch, is placed in the pocket, the hook 3 is caused to engage with the cloth forming the pocket, which effectually prevents the watch from being abstracted by stealth from the pocket. If it is not found desirable to employ the safety-hook, it is turned back and sheathed within the groove 8 by a simple reversal of the operation above outlined.

My improved safety attachment is also useful to prevent the watch from falling out of the pocket of the wearer, especially when in the act of stooping, or, in other words, to prevent the watch from being accidentally dislodged from the pocket.

I claim—

1. A safety attachment for watches, consisting of a watch-chain swivel provided with a hook, the shank of which is pivoted in the longer curved arm of the swivel.

2. A safety attachment for watches, consisting of a watch-chain swivel provided with a hook corresponding in shape with the longer curved arm of the swivel and pivoted therein.

3. A safety attachment for watches, consisting of a watch-chain swivel provided with a hook corresponding in shape with the longer curved arm of the swivel and pivoted to and sheathable within such arm.

In testimony whereof I have signed my name to this specification in the presence of two subscribing witnesses.

SIMON COHEN.

Witnesses:
OVID COHEN,
W. T. MILLER.